Patented Feb. 6, 1940

2,189,563

UNITED STATES PATENT OFFICE 2,189,563

CONDENSATION OF FORMALDEHYDE WITH UREA AND PHENYLTHIOUREA

Hans Dohse and Rolf Röber, Dortmund, Germany

No Drawing. Application May 10, 1938, Serial No. 206,997. In Germany May 13, 1937

1 Claim. (Cl. 260—69)

It has already been proposed to act with formaldehyde on urea and thiourea in order to obtain artificial substances accessible to hardening and fit for being employed as equivalents for horn, amber and other similar natural products.

Now it has been found that mixtures of urea and phenyl thiourea may be condensed very advantageously to similar artificial substances of excellent mechanical properties. This is surprising since, as results from the literature, phenyl thiourea when employed alone yields condensation products which remain glutinous or greasy even after a longer treatment in vacuo, being therefore unfit as equivalents for the above named natural products. Moreover the employment of phenyl thiourea shows the advantage that it may be prepared by simple condensation of ammonium thiocyanide with hydrochloric aniline. In this way a fundamentally new sphere of employment is opened to the ammonium thiocyanide obtained on the distillation of coal in enormous quantities and only hard to utilize. The employment of phenyl thiourea offers the further advantage that the water solubility of the condensation product so obtained is exceedingly diminished, probably by the introduction of the phenyl group. This is expressed by the exceedingly high surface resistance of products filled with wood powder which still amounts even after storing in water to about 140,000 Ω. The addition of urea cannot be completely omitted in that otherwise no products capable of hardening are obtained. However, the urea may be partially replaced by other substances reacting with formaldehyde such as phenol, thiourea, aniline and the like. The new process may be explained by the following example:

152 parts (by weight) phenyl thiourea and 120 parts urea are dissolved in 480 parts formaldehyde (aqueous solution of 41%). 18 parts hexamethylenetetramine are added and the whole mixture is now heated during 10 to 30 minutes to about 80–95° C. Now the water is distilled off in vacuo. A syrupy glutinous liquid remains which grows hard on further heating. On heating to about 80° C. during 6–8 hours a resin is obtained which may be easily pulverized after cooling. The compressible powder so obtained may be worked up without any trouble in heated press-devices of usual construction, and, what is more, alone or mixed with the usual colouring materials, softening substances or filling materials such as wood powder, asbestos, linen, cotton, paper etc.

We claim:

In the method of producing condensation products the improvement which consists in heating urea, monophenyl thiourea and formaldehyde in the presence of substances which act as condensing agents.

HANS DOHSE.
ROLF RÖBER.